US009475356B2

(12) United States Patent
Wilson (10) Patent No.: US 9,475,356 B2
(45) Date of Patent: Oct. 25, 2016

(54) TOP MOUNT'S HIGH PERFORMANCE MAIN RESILIENT OR ELASTOMERIC ELEMENT

(71) Applicant: GM Global Technology Operations LLC, Detroit, MI (US)

(72) Inventor: Bryan D. Wilson, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 236 days.

(21) Appl. No.: 13/733,373

(22) Filed: Jan. 3, 2013

(65) Prior Publication Data

US 2014/0070471 A1    Mar. 13, 2014

Related U.S. Application Data

(60) Provisional application No. 61/700,408, filed on Sep. 13, 2012.

(51) Int. Cl.
*B60G 11/22* (2006.01)
*B60G 15/06* (2006.01)

(52) U.S. Cl.
CPC ............. *B60G 11/22* (2013.01); *B60G 15/067* (2013.01); *B60G 2204/12* (2013.01); *B60G 2204/128* (2013.01); *B60G 2204/41* (2013.01); *B60G 2204/418* (2013.01)

(58) Field of Classification Search
CPC ....... F16F 9/54; B60G 11/22; B60G 15/067; B60G 2204/41; B60G 2204/418; B60G 2204/128
USPC .................................. 267/219–220, 292–293
See application file for complete search history.

(56) References Cited

U.S. PATENT DOCUMENTS

| 5,064,176 A * | 11/1991 | Goto .................... 267/140.11 |
| 5,232,209 A | 8/1993 | de Fontenay |
| 2005/0115785 A1* | 6/2005 | Thomas .................. 188/321.11 |
| 2006/0108727 A1* | 5/2006 | Hees ........................ 267/141.2 |
| 2006/0244188 A1* | 11/2006 | Johnson ............... F16F 1/3735 267/293 |
| 2007/0009190 A1 | 1/2007 | Yano |
| 2009/0116772 A1* | 5/2009 | Herman et al. ............... 384/224 |

FOREIGN PATENT DOCUMENTS

| CN | 1395528 A | 2/2003 |
| FR | 2789628 A1 * | 8/2000 |

OTHER PUBLICATIONS

Chinese Office Action dated Aug. 31, 2015 ; Application No. 201310417192.1 ; Applicant: GM Global Technology Operations LLC. ; 9 Pages.

* cited by examiner

*Primary Examiner* — Anna Momper
(74) *Attorney, Agent, or Firm* — BrooksGroup

(57) ABSTRACT

One variation may include a product comprising a top mount for a strut comprising a first shell portion and a second shell portion and a main resilient or elastomeric element housed by the first shell portion and the second shell portion, the resilient or elastomeric element being split into at least two pieces and construct and arranged to receive a portion of a strut rod. One variation may include a product for using in a strut top mount comprising an outer shell and a main resilient or elastomeric element received in the outer shell, the main resilient or elastomeric element being split into at least two pieces and being constructed and arranged to receive a portion of a strut rod.

10 Claims, 11 Drawing Sheets

TOP MOUNT'S HIGH PERFORMANCE MAIN RESILIENT OR ELASTOMERIC ELEMENT

CROSS REFERENCE TO RELATED APPLICATIONS

This application claims the benefit of U.S. Provisional Application No. 61/700,408 filed Sep. 13, 2012.

TECHNICAL FIELD

The field to which this disclosure generally relates includes products including a top mount for a strut and methods of making and using the same.

BACKGROUND

A strut may be connected to a vehicle using a top mount.

SUMMARY OF SELECT ILLUSTRATIVE VARIATIONS OF THE INVENTION

One variation may include a product comprising a top mount for a strut comprising a first shell portion and a second shell portion and a main resilient or elastomeric element housed by the first shell portion and the second shell portion, the resilient or elastomeric element being split into at least two pieces and construct and arranged to receive a portion of a strut rod.

One variation may include a product for using in a strut top mount comprising an outer shell and a main resilient or elastomeric element received in the outer shell, the main resilient or elastomeric element being split into at least two pieces and being constructed and arranged to receive a portion of a strut rod.

Other variations of the invention will become apparent from the detailed description provided hereinafter. It should be understood that the detailed description and specific examples, while disclosing illustrative variations of the invention, are intended for purposes of illustration only and are not intended to limit the scope of the invention.

BRIEF DESCRIPTION OF THE DRAWINGS

Illustrative variations of the invention will become more fully understood from the following brief description of the drawings.

DETAILED DESCRIPTION OF SELECT ILLUSTRATIVE VARIATIONS

The following detailed description of select variations is merely illustrative in nature and is in no way intended to limit the claimed inventions, applications, or uses.

Figures 1, 2:
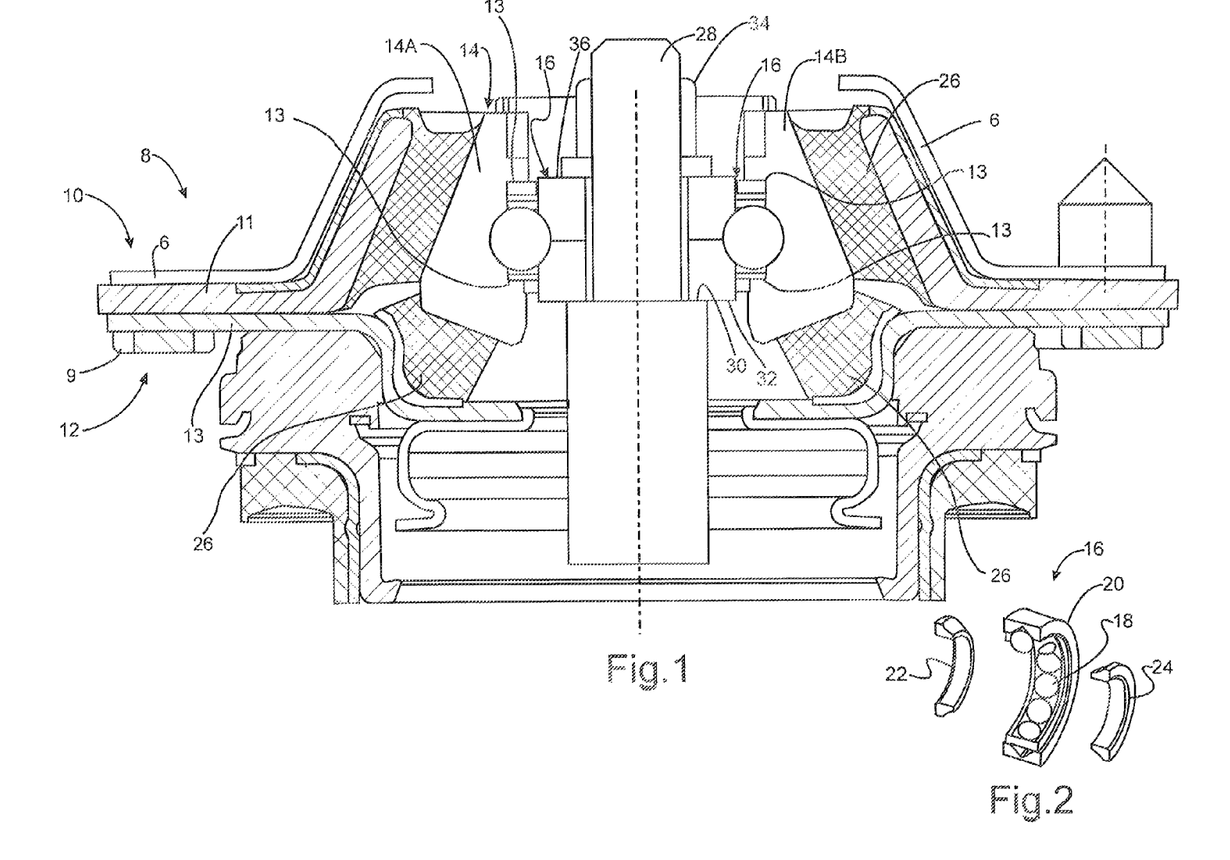
FIG. 1 is a sectional view of a top mount for a strut having a rigid inner strut rod attachment component according to a number of variations of the invention.
FIG. 2 is an exploded perspective view with portions remove of a bearing useful according to a number of variations of the invention.

FIG. 1 is a sectional view of a top mount for a strut according to a number of variations of the invention. The top mount 8 includes a first shell portion 10 and a second shell portion 12 which may be connected together using any of a number of fastening means including, but not limited to, a rivet, clinch nut, or a threaded bolt and a threaded nut 9. The first shell portion 10 may include an outer layer 11 which may be made of metal or other suitable material. Likewise, the second shell portion 12 may include an outer layer 13 made of metal or other suitable material. In one variation, the top mount 8 for a strut may include an inner strut attachment component 14, and a strut rod bearing 16 may be integrated therewith. In a number of variations, the inner strut rod attachment component 14 may have a cardiac shape and may be a single piece or may be at least two pieces. The inner strut rod attachment component 14 may be made of a material which is relatively rigid compared to a main resilient or elastomeric element discussed hereafter. Suitable rigid materials for the inner strut rod attachment component 14 include, but not limited to, polymeric materials or metals, including, but not limited to, at least one of a metal such as aluminum, steel or a fiber reinforced plastic or thermoset material such as nylon. The strut rod bearing 16 may include at least two pieces each of which house a plurality of bearings 18 which may be ball bearings or another shape bearing received in a bearing sleeve 20. A first end cap 22 and a second end cap 24 may be provided to retain the bearings 18 in the sleeve 20, as best shown in FIG. 2.

The top mount 8 may also include a main resilient or elastomeric element 26 which may be a single piece or multiple pieces. The main resilient or elastomeric element 26 may include any suitable compressible material constructed and arranged to repeatedly damp loads and may include, but is not limited to, a natural or synthetic rubber material. The main resilient or elastomeric element 26 may surround the inner strut rod attachment component 14 entirely or at least a portion thereof. A strut rod 28 may extend through an opening provided by the bearing pieces 16. The strut rod 28 may include a first shoulder 30 engaging a first face 32 of each of the bearing pieces 16 and a nut 34 may be threaded over the end of the strut rod 28 and may seat on a second face 36 of each of the bearing pieces 16. The bearing 16 may include a split inner race. The inner strut rod attachment component 14 and integrated strut rod bearing 16 allows for greater rotational movement of the strut rod 28 and results in better performance including load isolation, steering feel, durability and reduction of loose lumber noise.

Figure 3:
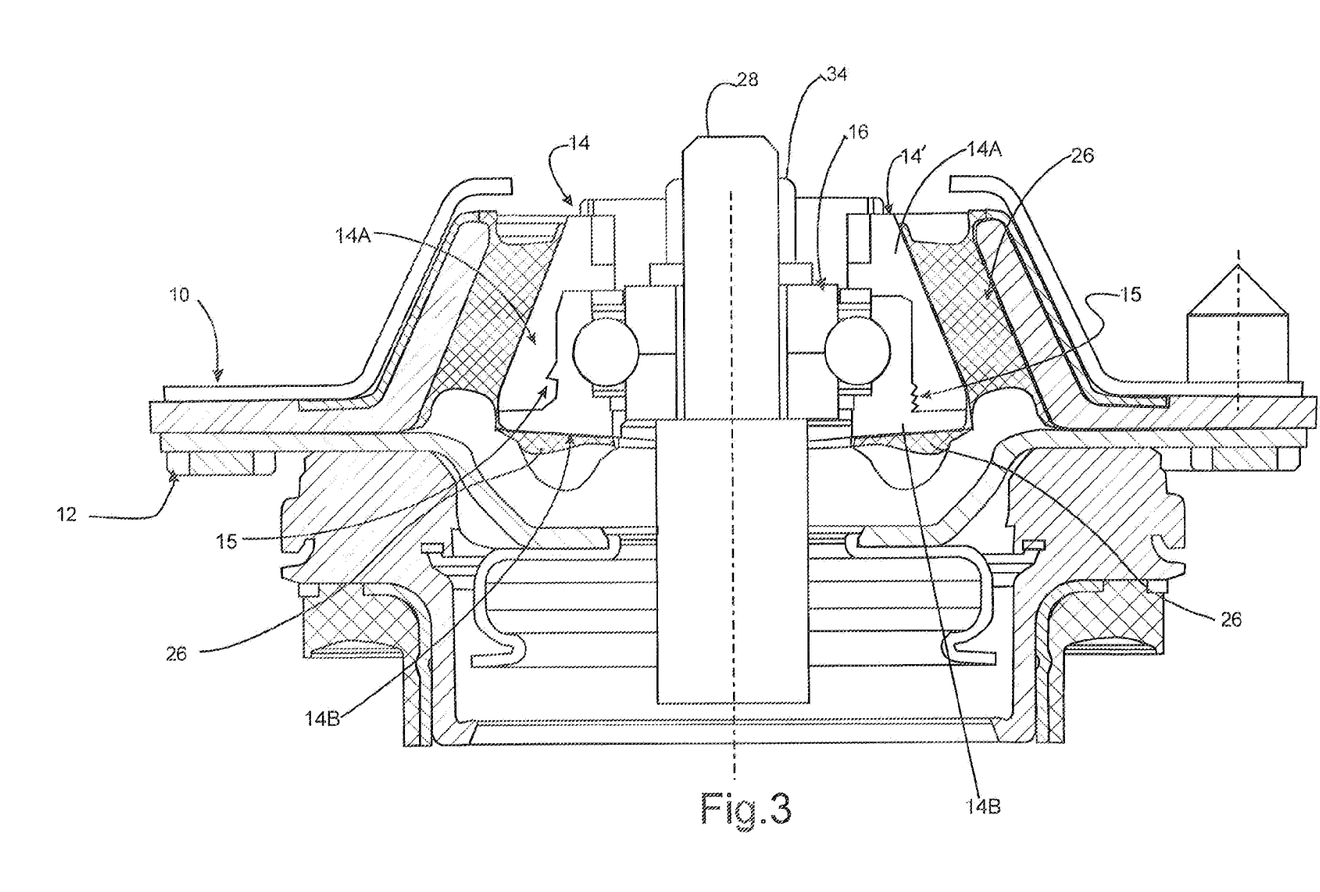
FIG. 3 illustrates a top mount for a strut including an inner strut rod attachment component include at least two pieces including a first upper inner strut rod attachment portion and a first lower inner strut rod attachment portion according to a number of variations of the invention.

Referring now to FIG. 3, in another variation, the inner strut rod attachment component 14 include at least two pieces including a first upper inner strut rod attachment portion 14A and a first lower inner strut rod attachment portion 14B. In upper inner strut rod attachment portion 14A may be mated to a lower inner strut rod attachment portion 14B and may include mechanically locking features 15 defined therein to secure the upper and lower strut rod attachment portions 14A, 14B together. Such an arrangement allows the pieces of the upper inner strut rod attachment portion 14A and the lower inner strut rod attachment portion 14B to be made separately and more cost-effectively. Furthermore, the upper strut rod attachment portion 14A may be received in the upper shell portion 10 and the lower strut rod attachment portion 14B may be received in the lower shell 12. However, mechanical locking features are not necessary and the upper inner strut rod attachment portion 14A and the lower inner strut rod attachment portion 14B may be simply held together by the first shell portion 10 and the second shell portion 12 when fastened together.

Figure 4:
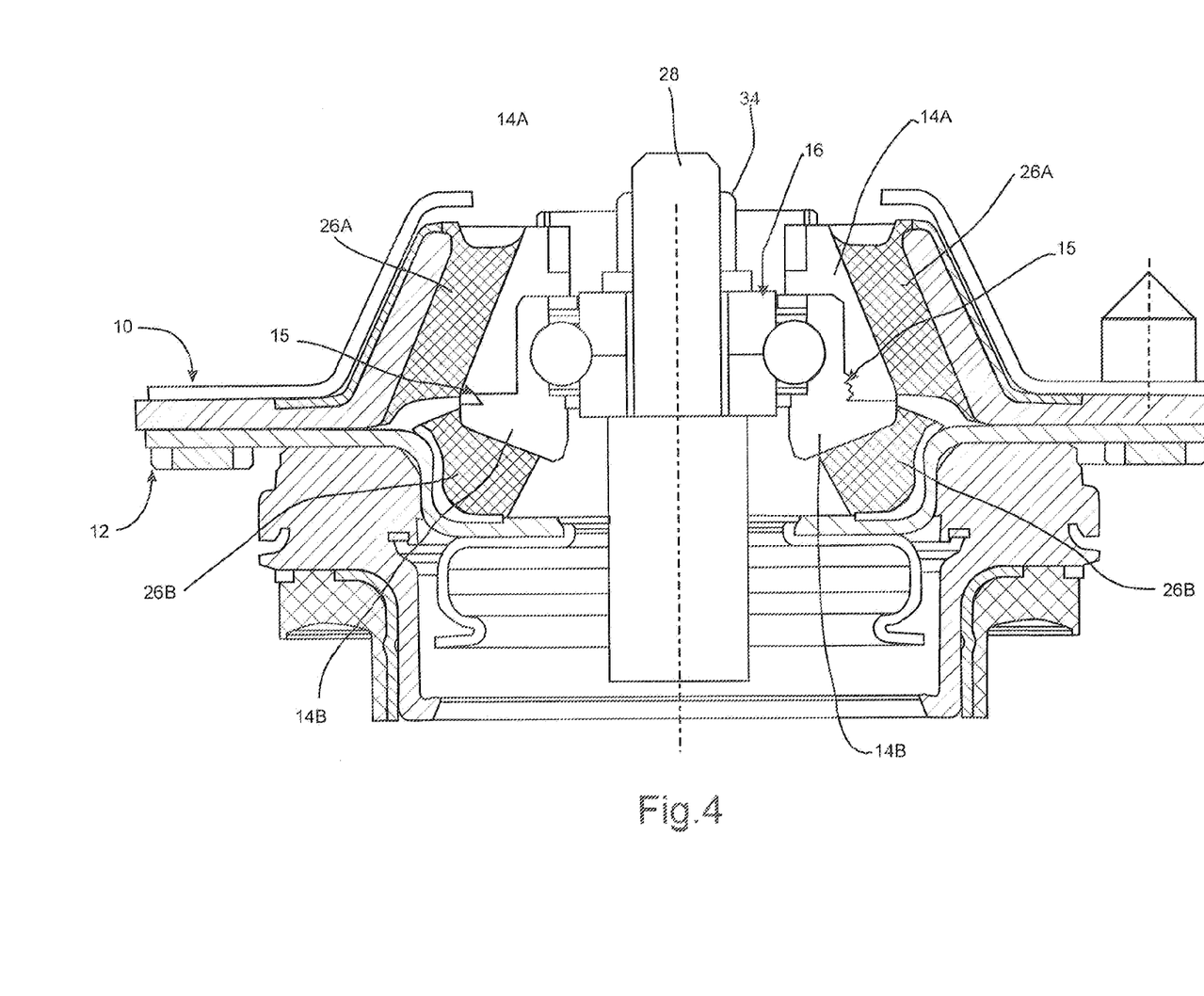
FIG. 4 illustrates a top mount for a strut including both a split inner strut rod attachment component and a split main resilient or elastomeric element according to a number of variations of the invention.

Referring now to FIG. 4, in a number of variations, the top mount 8 for a strut may include both a split inner strut rod attachment component 14 and a split main resilient or elastomeric element 26. In one variation, an upper resilient or elastomeric element 26A and a lower resilient or elastomeric element 26B may be provided. The upper resilient or elastomeric element 26A may be in axial compression. The split inner strut rod component 14 and the split main resilient or elastomeric element 26 allow for the calibration of the main resilient or elastomeric element 26 thereby improving the mount's static and dynamic performance. In a number of variations, an outer shell of can may be provided over the split portions of the main resilient or elastonieric element. In a number of variations an outer shell or can maybe, but is not limited to, at least one of steel, aluminum or a plastic or thermoset material, such as, for example, nylon. In a number of variations, splitting the main resilient or elastomeric element 26 may provide the advantage of being able to calibrate the main resilient or elastomeric element in two directions. In a number of variations other advantages of splitting the main resilient or elastomeric element may include better performance including load isolation, durability and reduction of loose lumber.

Figure 5:
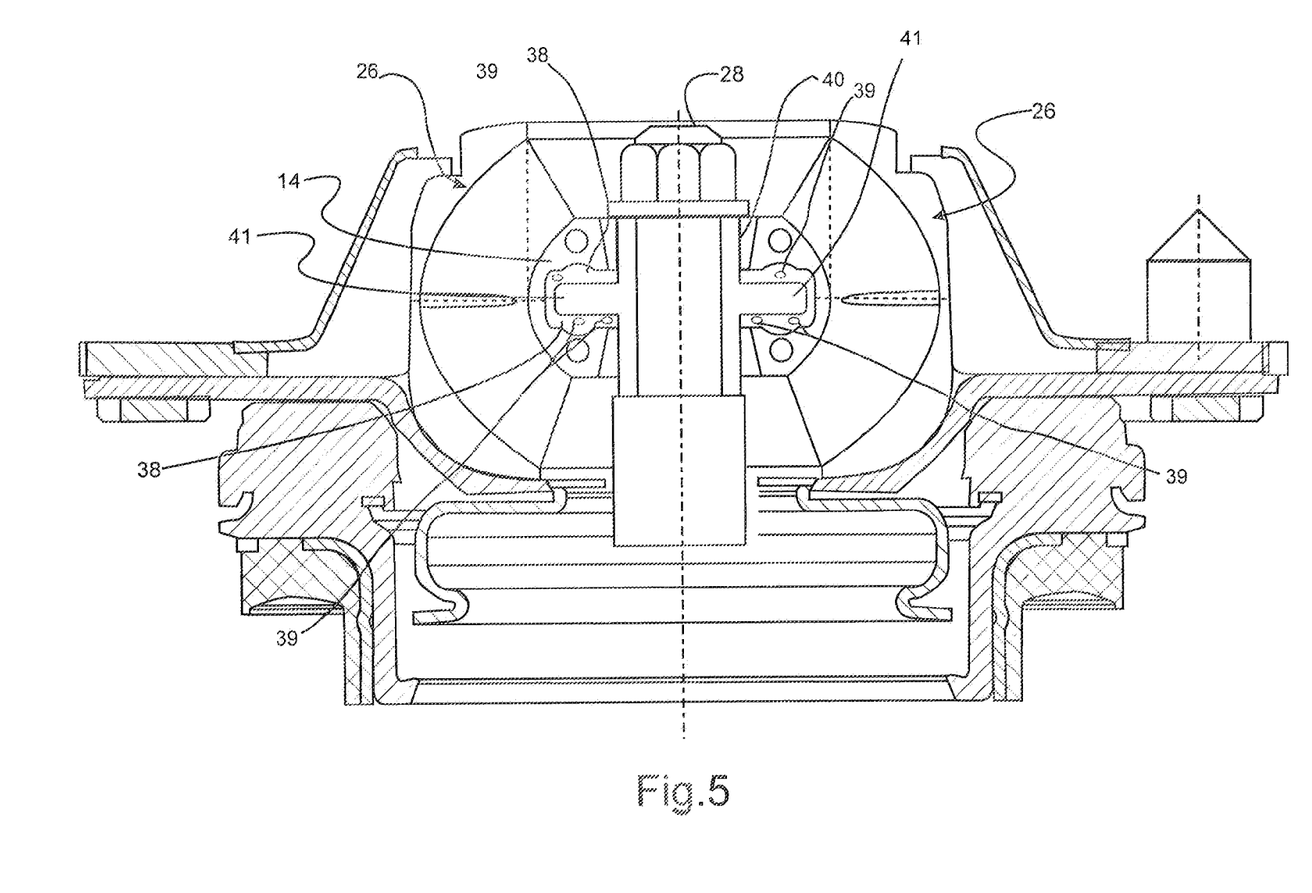
FIG. 5 illustrates a top mount for a strut including a high damping material and embedded in the main resilient or elastomeric element according to one variation of the invention.

Referring now to FIG. 5, in another variation, a high damping material 38 such as, but not limited to, microcellular urethane (MCU) 38 may be provided and may be embedded in the main resilient or elastomeric element 26. In one variation, the high damping material 38 may also be embedded in the inner strut rod attachment component 14 to absorb small road loads due to smooth road shake and course road noise. The high damping material 38 may cover a portion of a second strut rod attachment component or collar 40 through which the strut rod 28 extends. The second strut rod attachment component 40 may include a flange 41 extending in a radial direction. In one variation, the strut rod 28 and the attached second strut rod attachment component 40 are allowed to freely vibrate in the high damping material 38. A plurality of voids 39 may be provided in the MCU 38 to also calibrated performance. The main resilient or elastomeric element 26 may include a low damping natural resilient or elastomeric compound that may be "calibrated" with a phase angle and kd/kd ratio. The second inner strut rod attachment component 40 may be made from a rigid material including but not limited to a rigid plastic or a metal.

Figure 6:
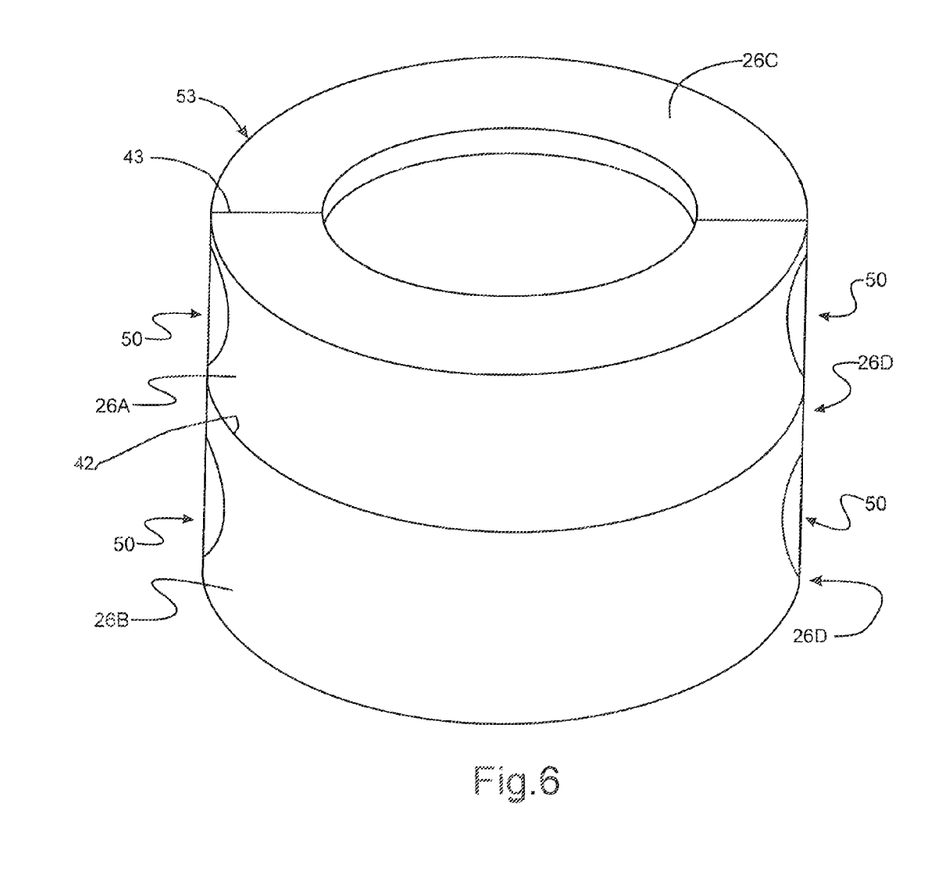
FIG. 6 illustrates a top mount for a strut including a main resilient or elastomeric element split into at least four pieces according to a number of variations of the invention.

Referring now to FIG. 6, in another variation, the main resilient or elastomeric element 26 may be split into at least four pieces. In one variation, the main resilient or elastomeric element 26 may include a radial split 42 and an axial fore-aft split 43 along the axis of the strut rod. In one variation, fore-aft voids may be provided in at least some of the main resilient or elastomeric element's 26A, 26B, 26C, 26D to lower the fore-aft rate and improved loose lumber. The axial fore-aft split 43 may be such that the main resilient or elastomeric element 26 is compressed in the cross-car direction to increase the axial to radial rate ratio. The four pieces of the main resilient or elastomeric element 26 allow the main resilient or elastomeric element 26 to be calibrated in two directions. The calibrated resilient or elastomeric element 26 of our pieces has optimal static and dynamic performance, and excellent durability. The voids 50 in the sides of the main resilient or elastomeric element 26 reduce the fore and aft stiffness. An outer shell 53 may be provided for each piece of the resilient or elastomeric element 26A, 26B, 26C, 26D. That is the outer shell 53 may include four pieces. Alternatively, the out shell 53 may be at least one piece into which the pieces of the main resilient or elastomeric element 26 are inserted. The outer shell may be made from a metal, polymer of fiber reinforced composite.

Referring again to FIG. 6, in one variation, the assembly of the main resilient or elastomeric element 26 into a horizontal and radial split allows a tool to be used to enter from the side through the radial split to insert the inner strut rod attachment component 14. The inner strut rod attachment component 14 may be multiple pieces. Thereafter the main resilient or elastomeric element 26 may be compressed. in another variation, the inner strut rod attachment component 14 may be provided as one piece and the four portions of the main resilient or elastomeric element 26 may be placed around the inner strut rod attachment component 14 and thereafter the main resilient or elastomeric element 26 may be compressed.

Figure 7:
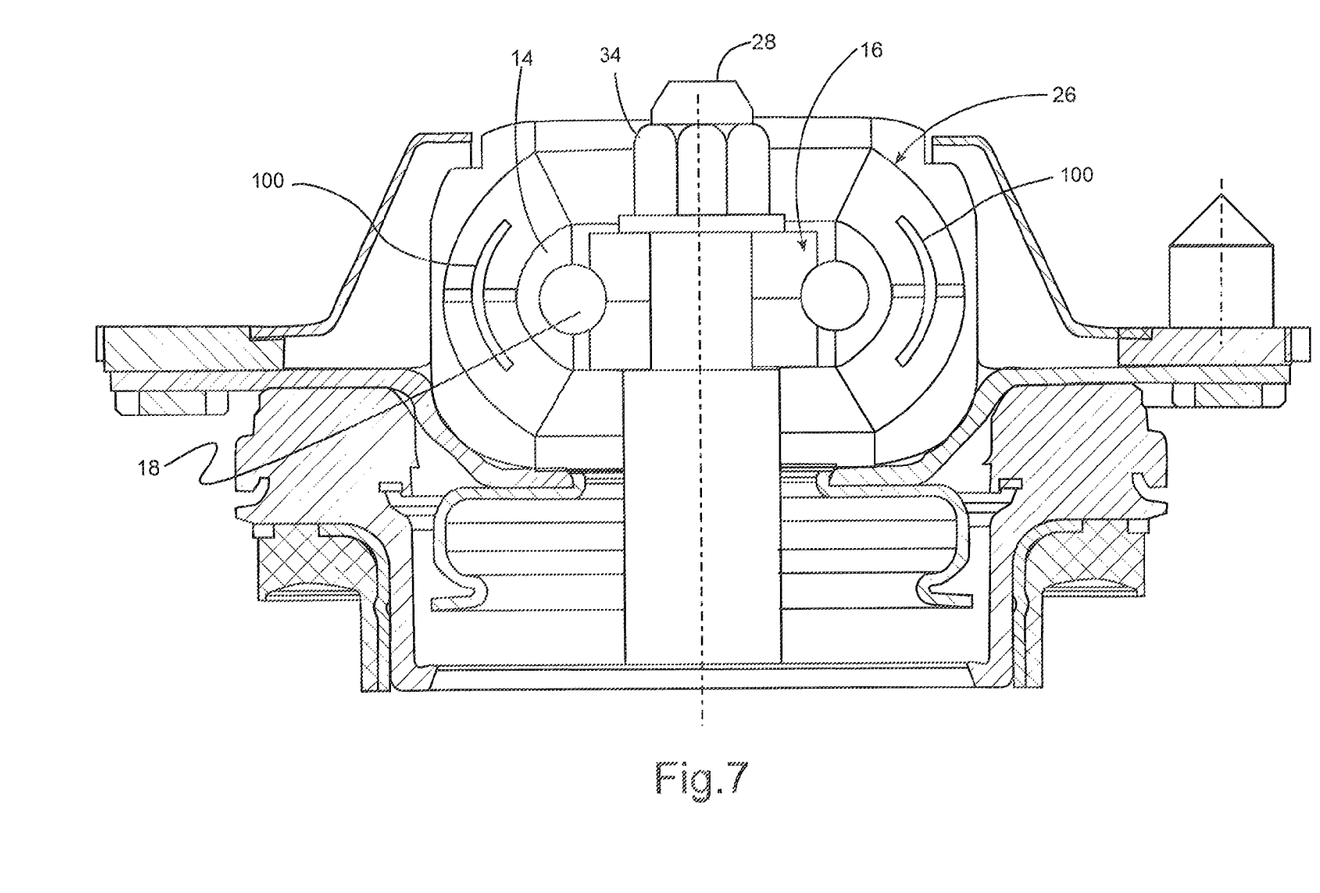
FIG. 7 illustrates a top mount for a strut including an inner strut rod attachment component 14 may have a spherical shape according to a number of variations of the invention.

Referring now to FIG. 7, in another variation, the inner strut rod attachment component 14 may have a spherical shape and the top mount 8 may have a bearing 16 integrated in the spherical shaped inner strut rod attachment component 14. The inner strut rod attachment component 14 having a spherical shape and an integrated bearing 16 provides for improved steering feel, and improves loose lumber.

Figures 8, 9:
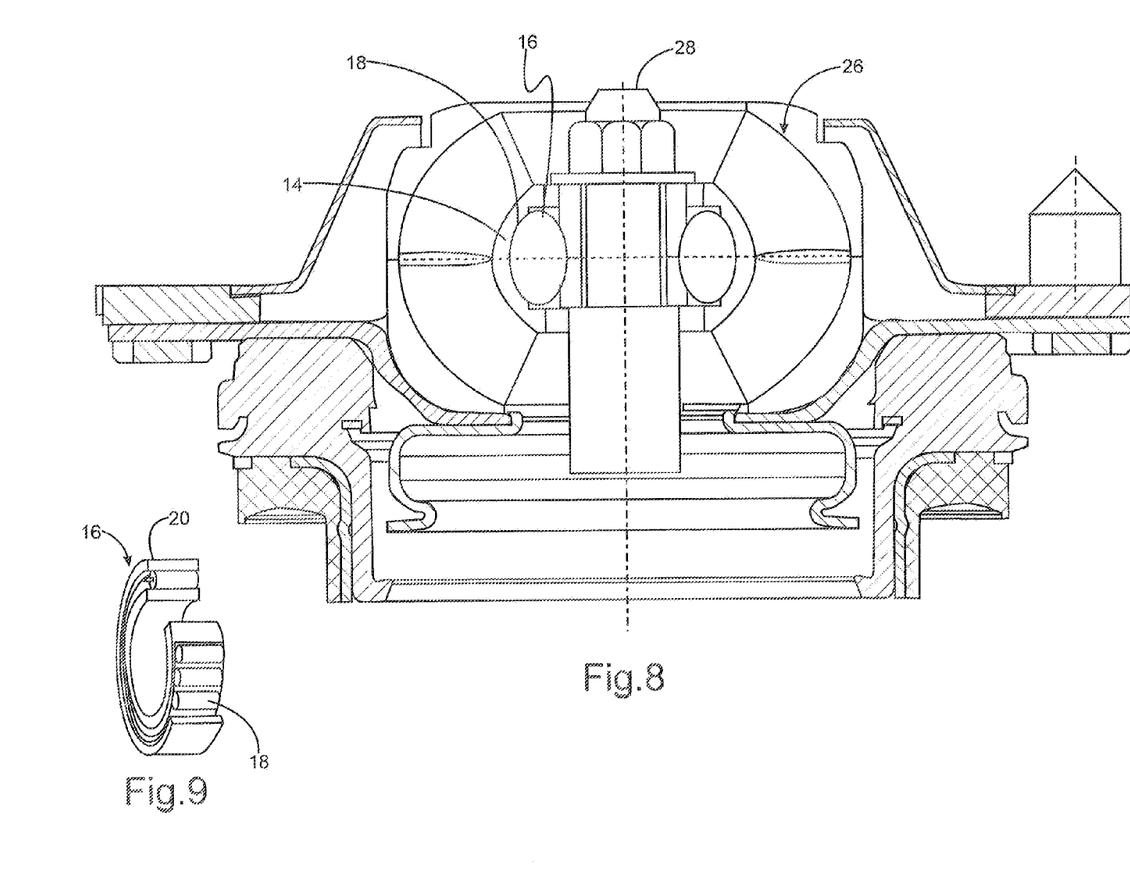
FIG. 8 illustrates a top mount for a strut including an inner strut rod attachment component with an integrated toroidal bearing according to a number of variations of the invention.
FIG. 9 is a perspective view with portions remove of a toroidal bearing useful according to a number of variations of the invention.

Referring now to FIG. 8, in another variation, the top mount 8 may include an inner strut rod attachment component 14 having a spherical shape with an integrated bearing 16 having toroidal bearings 18. The benefit of a strut rod top mount having this design provides for improved steering feel. The toroidal roller bearings 18 reduce the conical rate of the inner strut rod attachment component 14, which improves steering feel, loose lumber, handling and durability. FIG. 9 illustrates a bearing 16 having toroidal roll roller bearings 18.

Figure 10:
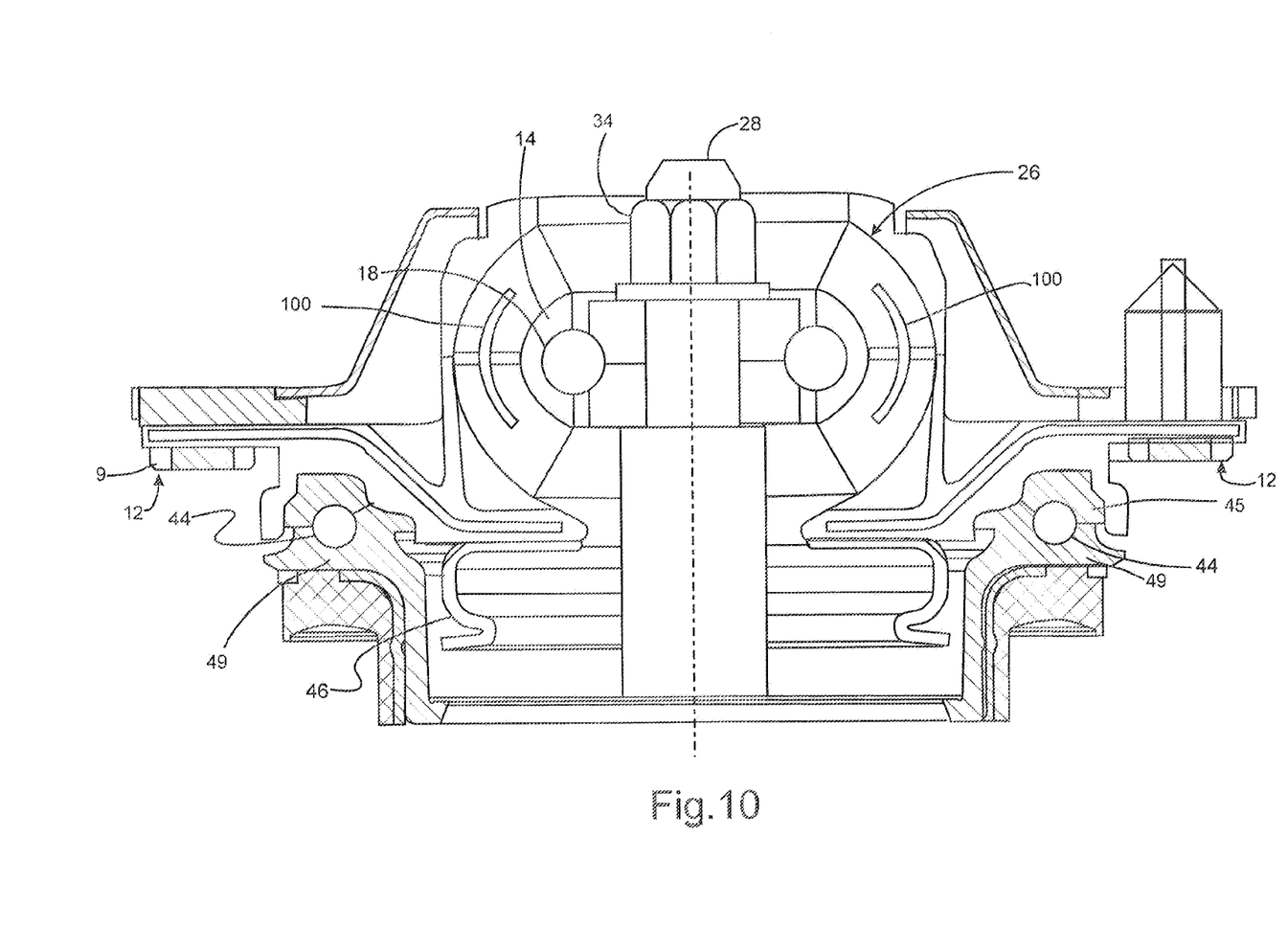
FIG. 10 illustrates a top mount for a strut including a lower shell portion having an integrated second strut bearing according to a number of variations of the invention.

Referring now to FIG. 10, in another variation, the top mount lower shell portion 12 may have an integrated upper spring bearing housing 45. A spring bearing 44 is received between the upper and lower spring bearing housings 45, 49. In one variation, a jounce bumper cup 46 may be made of any suitable material including, but not limited to, a metal such as steel and may be mechanically attached to the lower shell portion 12.

Figure 11:
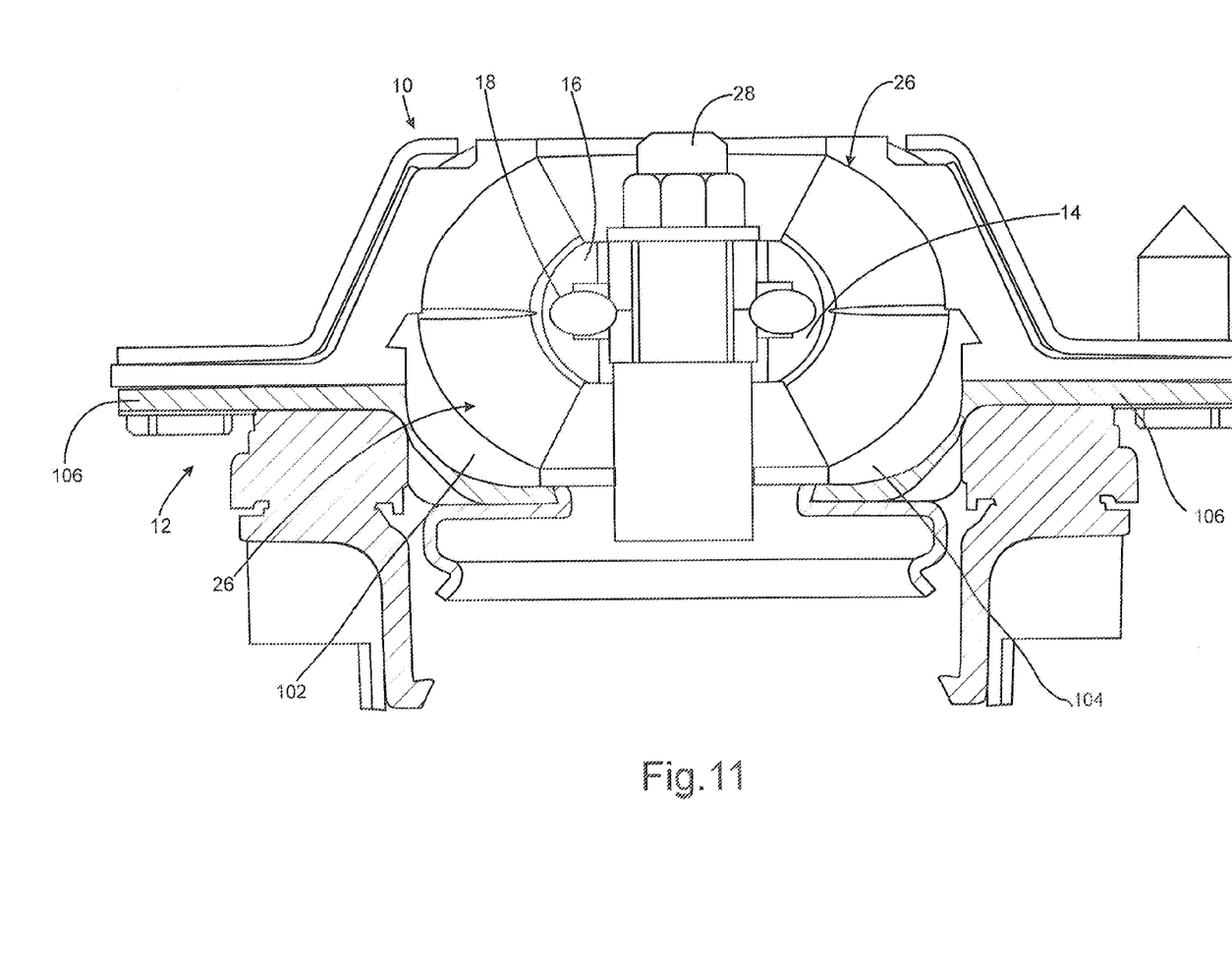
FIG. 11 illustrates a top mount for a strut including a main resilient or elastomeric element split into at least three pieces according to a number of variations of the invention.

Referring now to FIG. 11, in another variation, the main resilient or elastomeric element 26 may be split into at least three pieces. In one variation, the main resilient or elastomeric element 26 may include a radial split 42 and an axial fore-aft split 43 along the axis of the strut rod may be provided in the upper pieces of the two pieces after the radial split has been made.

Referring to FIG. 7, in a number of variations the invention may include one or ore rate plates 100 inserted or received in the main resilient or elastomeric element. The rate plates 100 may be a thin piece of material, which may include at least one of steel, aluminum, plastic or thermoset material, such as, but not limited to, nylon. The rate plate 100 may be positioned to increase the stiffness of the main resilient or elastomeric assembly. In a number of variations, the direction of the rate plate(s) may be cross-car in a top mount. In a number of variations, the rate plate(s) may have the shape of a section of a hollow cone or hollow sphere. In a number of variations, the rate plate(s) may have first and second opposite flat faces and first and second opposite sides. In one variation, the first and second opposite faces may have a height A, which may be for example 12 mm In another variation, the first and second opposite faces may have a second height B which is shorter than the width A to reduce the stiffness of the man resilient or elastomeric assembly in comparison to a main resilient or elastomeric assembly having rate plates with a greater width of the first and second opposite faces.

Figure 12:
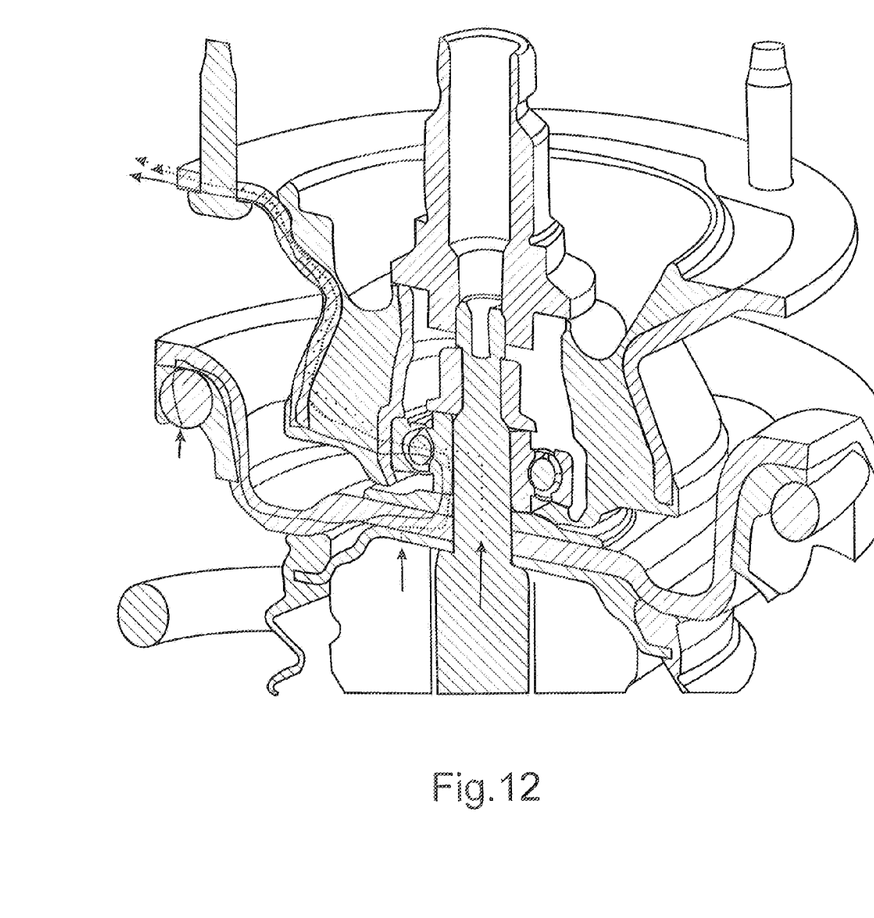
FIG. 12 illustrates one variation of a strut mount wherein the three strut module loads converge into a single path through the main resilient or elastomeric element.

FIG. 12 illustrates a strut mount wherein the three strut module loads converge into a single path through the main resilient or elastomeric element. The spring load, jounce bumper load and the strut rod load converge through the main resilient or elastomeric element.

Figure 13:
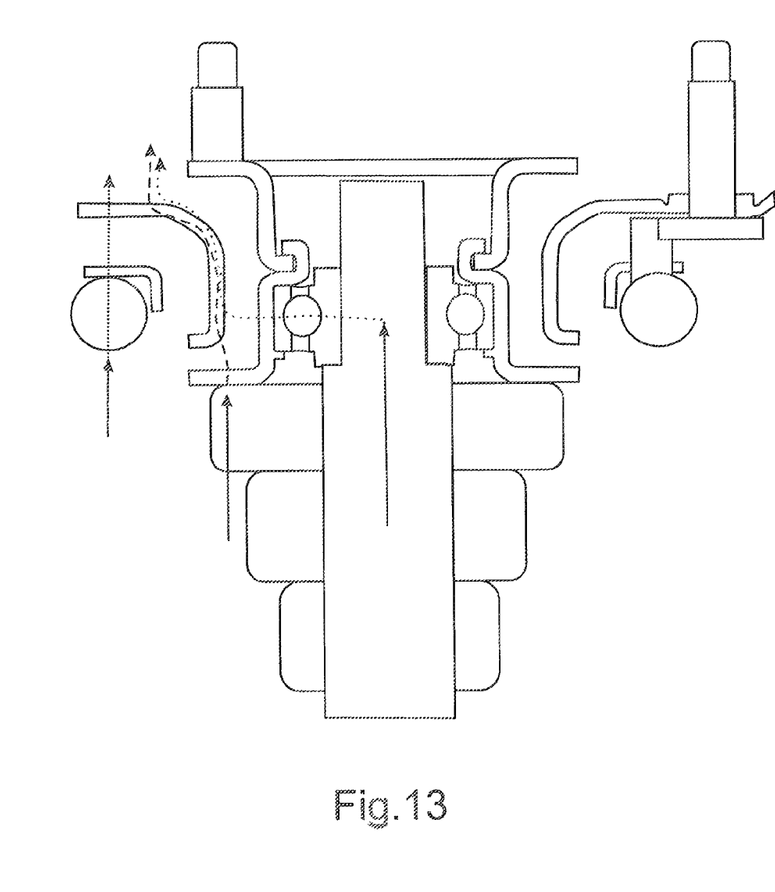
FIG. 13 illustrates one variation of a strut mount wherein strut module loads converge into two paths, one through the main resilient or elastomeric element and one through the top mount housing.

FIG. 13 illustrates a strut mount wherein strut module loads converge into two paths, one through the main resilient or elastomeric element and one through the top mount housing.

The above description of variations of the invention is merely illustrative in nature and, thus, variations thereof are not to be regarded as a departure from the spirit and scope of the invention.

What is claimed is:

1. A product comprising a top mount for a strut comprising a first shell portion and a second shell portion and a main resilient or elastomeric element housed by the first shell portion and the second shell portion, the resilient or elastomeric element being split into at least four pieces and construct and arranged to receive a portion of a strut rod and further comprising an inner strut rod attachment component, and wherein the main resilient or elastomeric material surrounds at least a portion of the inner strut rod attachment component and further comprising a bearing received in the inner strut rod attachment component and further comprising an outer shell surrounding the main resilient or elastomeric element and received in the first shell portion and second shell portion.

2. A product as set forth in claim 1 wherein the main resilient or elastomeric element is split into at least a lower resilient or elastomeric element and an upper resilient or elastomeric element and wherein the upper resilient or elastomeric element is in axial compression.

3. A product as set forth in claim 1 wherein the main resilient or elastomeric element is split into at least four pieces by a radial split and an axial fore-aft split.

4. A product as set forth in claim 3 further comprising an outer shell and wherein the four pieces of the main resilient or elastomeric element is received in the outer shell.

5. A product as set forth in claim 4 wherein the outer shell is a single piece.

6. A product as set forth in claim 1 further comprising an outer shell comprising four pieces and wherein one of the four pieces of the main resilient or elastomeric element is received in a respective one of the four pieces of the outer shell.

7. A product as set forth in claim 1 wherein the main resilient or elastomeric element has a plurality of voids formed therein to reduce the fore and aft stiffness of the main resilient or elastomeric element.

8. A product as set forth in claim 1 wherein the inner strut rod attachment component has a cardiac shape.

9. A product as set forth in claim 1 wherein the bearing is split into at least two pieces.

10. A product as set forth in claim 1 wherein the inner strut rod attachment component include at least two pieces including a first upper inner strut rod attachment portion and a first lower inner strut rod attachment.

\* \* \* \* \*